March 8, 1960  G. WALTHER, SR  2,927,823
VEHICLE WHEEL FOR MOUNTING DROP CENTER RIMS
Filed Nov. 2, 1956  2 Sheets-Sheet 1
FIG. 1
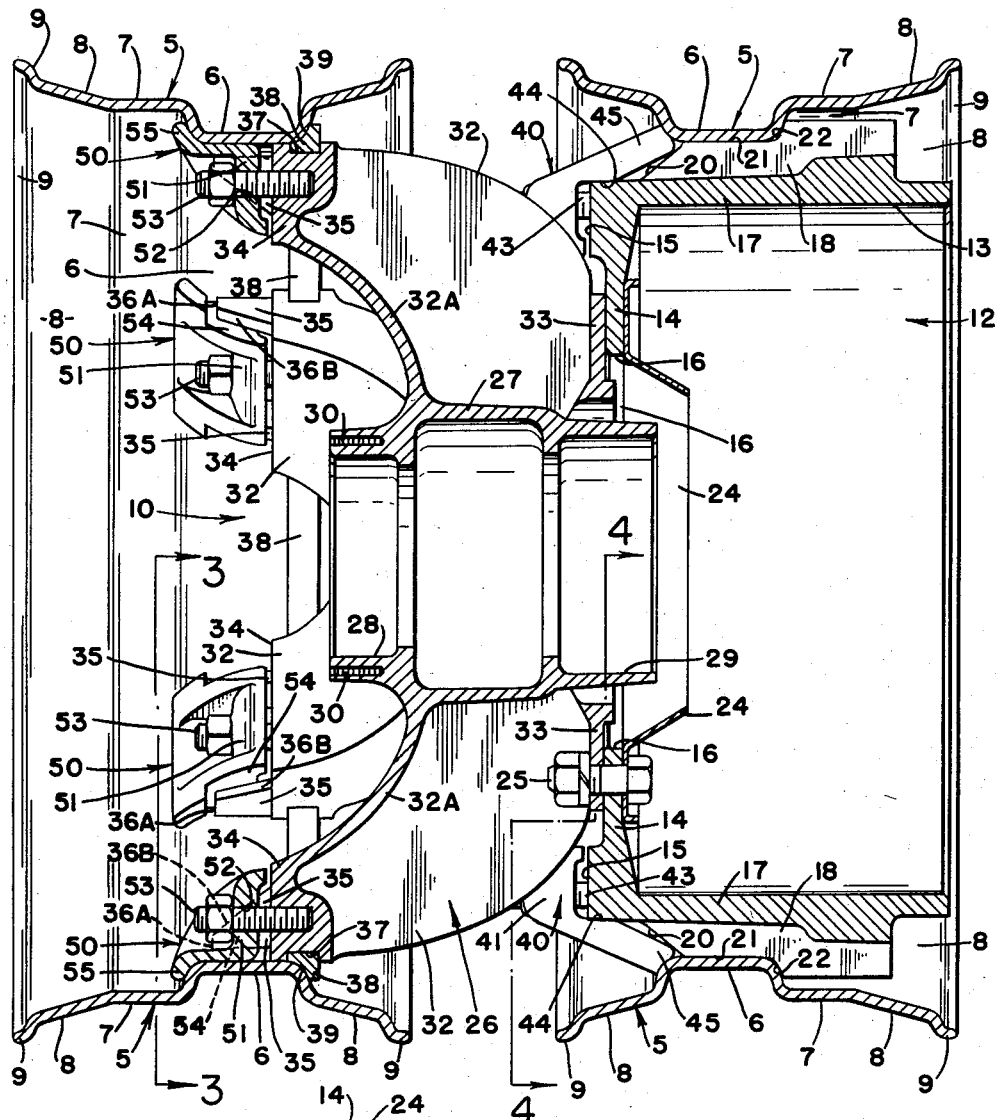
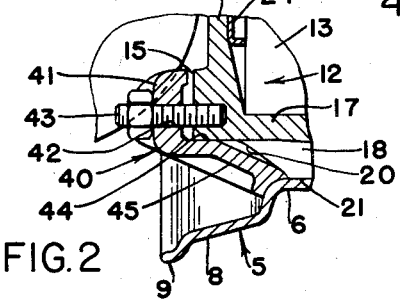
FIG. 2
INVENTOR.
GEORGE WALTHER, SR.
BY
ATTORNEYS

INVENTOR.
GEORGE WALTHER, SR.
BY
ATTORNEYS

United States Patent Office 2,927,823
Patented Mar. 8, 1960

2,927,823

VEHICLE WHEEL FOR MOUNTING DROP CENTER RIMS

George Walther, Sr., Dayton, Ohio, assignor to The Dayton Steel Foundry Company, Dayton, Ohio, a corporation of Ohio Application November 2, 1956, Serial No. 620,082

5 Claims. (Cl. 301—13)

The present invention relates to vehicle wheels for mounting drop center rims. More particularly, the invention relates to an improved wheel assembly and construction providing for the secure and accurate mounting of "drop center" rims in dual fashion.

As is well known, wide spread commercial use of tubeless tires has necessitated the development of improved forms of tire rim construction, including new forms of "drop center" rims which permit the rim mounting of tubeless tires having a proportionately large bead section in an expeditious manner. These new rim constructions have made necessary new wheel constructions. Further, the small internal diameter of a drop center rim has created heretofore unsatisfactorily solved problems when the rims were required to be mounted in dual fashion, as for example on heavy duty trucks and trailers.

Accordingly, it is an object of the invention to provide an improved wheel construction for the mounting of drop center rims. It is a further object to provide a wheel construction particularly well suited for the secure and accurate mounting of "drop center" rims in dual fashion.

These and other objects of the invention will be apparent in view of the following detailed description thereof taken in conjunction with the attached drawings.

In the drawings:

Fig. 1 is a vertical cross-section of the improved wheel construction with drop center rims mounted in dual fashion;

Fig. 2 is a fragmentary cross-section, taken substantially on line 2—2 of Fig. 4, showing a clamp lug for securing an inner rim to the brake drum;

Figure 3:
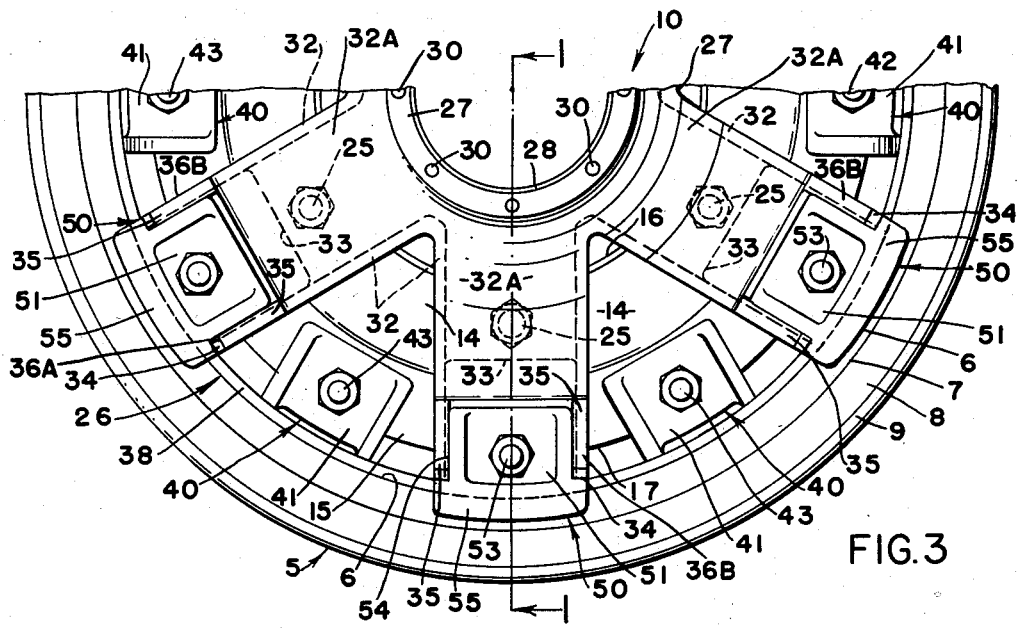
Fig. 3 is a partial plan view, taken substantially on line 3—3 of Fig. 1, showing the wheel and outer rim mounting; and, Fig. 4 is a partial plan view, taken substantially on line 4—4 of Fig. 1, showing the wheel and inner rim mounting.
Figure 4:
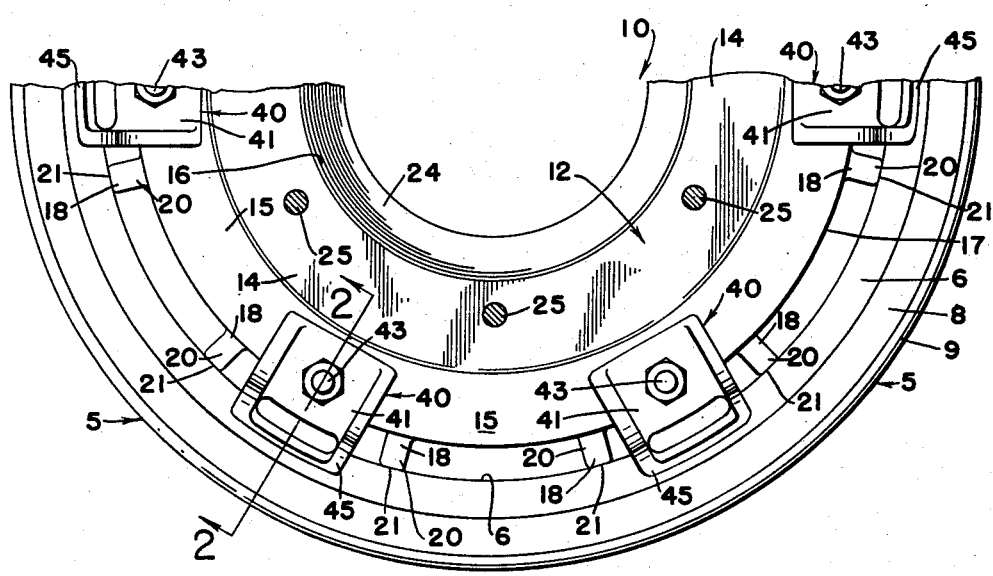

The drop center rims shown in the drawings and indicated generally by the numeral 5 are of conventional design. Referring to Fig. 1, each rim 5 includes a radially inwardly directed center well 6, a safety ledge 7, bead flanges 8 having a standard 15–20° taper and terminating in the outer low or side flanges 9.

The wheel assembly is indicated generally by the numeral 10 with each element thereof being annular unless otherwise noted. Referring to Fig. 1 the assembly 10 includes a preferably cast brake drum, indicated generally by the numeral 12, which is affixed on the vehicle axle (not shown) in a conventional manner. The internal diameter of the drum is concentrically machined as at 13 for braking purposes. The outwardly facing end 14 of the drum is provided with a flat peripheral clamping lug flange 15 and a large diameter axial bore 16. The outer periphery 17 of the drum is provided with a plurality of equally spaced, preferably twelve, axially directed ribs 18 which seat the inner rim 5. Each rib 18 includes an inwardly inclined portion 20 and a substantially straight axial portion 21 for fitting within and abutting the inner surface of the well portion 6 of a rim 5. In actual practice, a clearance between the well and ribs in the range of .01–.05 inch is satisfactory. Inwardly of the straight portion 21, the rib 18 has a second nearly radial inclined portion 22 defining a ledge or abutment for receiving and positioning the inner facing corner of the well portion 6 of the rim.

The brake drum 12 also has a suitable substantially conical oil shield 24 secured to its end 14 by a plurality of equally spaced, preferably five or six, wheel assembly bolts 25.

The wheel assembly 10 also includes an outer wheel indicated generally by the numeral 26. The wheel has a hub portion 27 having finished annular seats 28 and 29 for suitable anti-friction bearings. When the axle and bearings (not shown) are in place within the hub, the outer end thereof may be closed with a cover plate (also, not shown) bolted in the tapped holes 30. Extending radially and outwardly of the hub 27 are a plurality of equally spaced, preferably five or six spoke members having parallel side ribs 32 connected by outer facing webs 32A. Each spoke member is dished inwardly toward the hub of the wheel and has on the inner facing side thereof a flange section or web 33 through which is inserted a bolt 25 so as to fasten the outer wheel 26 to the brake drum 12.

The outer face or end 34 of each spoke member 32 has a pair of tapered outwardly directed lug positioning flanges 35. The outermost surface 36A of each flange 35, as well as the peripheral flange 15 of the drum 12, are preferably machined in a plane at substantially a right angle to the axis of rotation of the wheel assembly. The vertical surfaces 36A, together with the tapered surfaces 36B, accurately locate and seat the clamping lugs described below.

The outer circumference of each outer end 34 has a diameter substantially the same as the internal diameter of the well portion 6 of the rim 5 and, also has a circumferential notch 37, preferably square in cross-section, to receive and position a snap ring 38.

The snap ring 38 has an inwardly curved outer face portion 39 defining a ledge, similar in function to the ledge 22 on the brake drum ribs 18, for receiving the inner facing portion of the well 6 of the outer rim 5.

The inner and outer rims are secured on the brake drum 12 and outer wheel 26, by specially adapted clamps or lugs. A plurality of lugs, preferably five or six and each indicated generally by the numeral 40, secure the inner rim to the brake drum. Referring to Fig. 2, each lug 40 has a main body portion 41 with a bore 42 therethrough for insertion of a threaded fastening bolt 43 into the lug flange 15. The body portion 41 also has an inwardly extending portion 44 which is substantially parallel to and conforms with the outer side of the flange 15 so as to position the lug 40 during fastening. Inclined radially outwardly of the portion 44 is a reinforced rim engaging portion 45, the end of which conforms substantially with the configuration of the outer facing edge of the well portion 6 of the inner rim.

A plurality of lugs indicated generally by the numeral 50, and preferably five or six in number, secure the outer rim to the wheel 26. Referring to Fig. 1, each lug 50 has a main body portion 51 with a bore 52 therethrough for insertion of a threaded fastening bolt 53 into the end portion of each spoke member 32. Each lug 50 also has a pair of slotted or cut out portions 54, for engagement with the lug positioning flanges 35. Extending axially outwardly of the body portion 51 of each lug is a reinforced rim engaging portion 55, the end of which conforms substantially with the configuration of the outer facing edge of the well portion 6 of the outer rim.

The wheel assembly 10 is preferably assembled by bolting the wheel 26 to the brake drum 12 by bolts 25. As indicated above, the brake drum has previously been affixed to the vehicle axle. The axle bearings are then seated and the cover plate fastened in place. The inner rim 5 is then slipped over the wheel 26 and seated against surfaces 21 and 22 of each rib 18. The lugs 40 are then applied and tightened so as to secure the inner rim to the brake drum. The snap ring 38 is then fitted over the spoke members 32 of the outer wheel and seated in the notches 37. The outer rim 5 is then slipped over the ends of the spoke members and seated against surface 39 of the snap ring. Each lug 50 is then applied and tightened so as to secure the outer rim to the wheel 26.

It is apparent from the above description that the invention relates to a novel wheel assembly 10 that provides for the secure and accurate mounting of drop center rims 5. The construction is such as to permit the use of the same form of rims as both inner and outer rims. Further, in the event of an emergency, the wheel assembly will function when only an inner rim is mounted. It is also apparent that minor changes and modifications could be made without departing from the spirit of the invention and these are intended to be included within the scope of the subjoined claims.

What is claimed is:

1. A vehicle wheel assembly comprising a brake drum, a wheel fastened to said brake drum, and drop center rims mounted on the brake drum and the wheel, respectively, said brake drum including a plurality of equally spaced radially directed ribs extending axially substantially the full width thereof, each of said ribs having a load bearing area, defined by a substantially straight axial portion and a nearly radial portion, for seating one of said drop center rims, and a plurality of clamps for securing said rim to said brake drum; said wheel including a hub portion, a plurality of spoke members extending radially and outwardly of said hub, means for seating the other of said drop center rims on and around said spoke members, and a plurality of clamps for securing said rim to said wheel.

2. A vehicle wheel assembly comprising an inner brake drum, an outer wheel fastened to said brake drum, and rims having a radially inwardly directed center well portion mounted on the brake drum and the outer wheel, respectively, said brake drum including a plurality of equally spaced radially directed ribs extending axially substantially the full width thereof, each of said ribs having an axial portion for fitting within the internal diameter of the well portion of said rims and a nearly radial portion defining a ledge for receiving and positioning the inner facing corner of the well portion of one of said rims; and a plurality of clamps for securing said rim against said rims; said wheel including a hub portion, a plurality of spoke members extending radially and outwardly of said hub, the circumferential face of each of said spoke members having a diameter substantially the same as the internal diameter of the well portion of said rims and a notch therein, an annular ring secured around the circumferential face of said spoke members in said notches, said ring having an inwardly curved face defining a portion for receiving and positioning the inner facing corner of the well portion of the other of said rims, and a plurality of clamps for securing said rim against said ring.

3. A vehicle wheel assembly comprising, an inner brake drum, an outer wheel fastened to said brake drum, and rims having a radially inwardly directed center well portion mounted on the brake drum and the outer wheel, respectively, said brake drum including a plurality of radially directed ribs extending axially substantially the full width thereof for seating one of said rims and a plurality of clamps for securing said rim to said ribs; said wheel including a hub portion, a plurality of spoke members extending radially and outwardly of said hub, the circumferential face of each of said spoke members having a diameter substantially the same as the internal diameter of the well portion of said rims and a notch therein, an annular ring secured around the circumferential face of said spoke members in said notches, said ring having an inwardly curved face defining a portion for receiving and positioning the inner facing corner of the well portion of the other of said rims, and a plurality of clamps for securing said rim against said ring.

4. A vehicle wheel assembly comprising, an inner brake drum, an outer wheel fastened to said brake drum, and rims having a radially inwardly directed center well portion mounted on the brake drum and the outer wheel, respectively, said brake drum including a plurality of equally spaced radially directed ribs extending axially substantially the full width thereof, each of said ribs having a straight axial portion with an outer circumferential diameter substantially the same as the internal diameter of the well portion of said rims and a nearly radial portion inwardly inclined from said straight portion so as to define a ledge for receiving and positioning the inner facing corner of the well portion of one of said rims; and a plurality of clamps for securing said rim against said ribs; said wheel including a hub portion, a plurality of spoke members extending radially and outwardly of said hub, a means for seating the other of said rims extending circumferentially around said spoke members and a plurality of clamps for securing said rim to said wheel.

5. A vehicle wheel assembly comprising, in combination, an inner brake drum, an outer wheel fastened to said brake drum, rims having a radially inwardly directed center well portion, said rims being mounted on the brake drum and outer wheel, respectively, and a plurality of rim clamping lugs, said brake drum including a plurality of equally spaced radially directed ribs extending axially substantially the full width thereof, each of said ribs having a straight axial portion with an outer circumferential diameter substantially the same as the internal diameter of the well portion of said rims and a nearly radial portion inwardly inclined from said straight portion so as to define a ledge for receiving and positioning the inner facing corner of the well portion of one of said rims, said wheel including a hub portion, a plurality of spoke members extending radially and outwardly of said hub, the circumferential face of each of said spoke members having a diameter substantially the same as the internal diameter of the well portion of said rims and a notch therein, and, an annular ring secured around the circumferential face of said spoke members in said notches, said ring having an inwardly curved face defining a portion for receiving and positioning the inner facing corner of the well portion of the other of said rims; certain of said clamps being attachable to the outer face of said drum and having a radially inwardly inclined portion for securing the first mentioned rim against said ribs, the remainder of said clamps being attachable to the outer face of each of said spoke members and having a radially outwardly directed portion for securing the second mentioned rim against said ring.

References Cited in the file of this patent

UNITED STATES PATENTS

| | | |
|---|---|---|
| 1,544,297 | Einfeldt | June 30, 1925 |
| 1,780,897 | Bellamore | Nov. 11, 1930 |
| 1,894,251 | Woodward | Jan. 10, 1933 |
| 1,952,967 | Boughton | Mar. 27, 1934 |
| 1,975,273 | Higbee | Oct. 2, 1934 |
| 2,274,503 | Reid | Feb. 24, 1942 |
| 2,414,156 | Malthaner | Jan. 14, 1947 |
| 2,509,052 | Ash | May 23, 1950 |

FOREIGN PATENTS

| | | |
|---|---|---|
| 146,739 | Switzerland | July 16, 1931 |

UNITED STATES PATENT OFFICE

CERTIFICATE OF CORRECTION

Patent No. 2,927,823

March 8, 1960

George Walther, Sr.

It is hereby certified that error appears in the printed specification of the above numbered patent requiring correction and that the said Letters Patent should read as corrected below.

Column 3, line 55, for "said rims;" read -- said ribs; --.

Signed and sealed this 23rd day of August 1960.

(SEAL)
Attest:

KARL H. AXLINE
Attesting Officer

ROBERT C. WATSON
Commissioner of Patents